(12) United States Patent  
Rikoski et al.

(10) Patent No.: US 9,180,940 B2  
(45) Date of Patent: Nov. 10, 2015

(54) SYSTEMS AND METHODS FOR A ROBUST UNDERWATER VEHICLE

(71) Applicant: Hadal, Inc., Oakland, CA (US)

(72) Inventors: Richard J. Rikoski, Alameda, CA (US); Robert S. Damus, Alameda, CA (US); Jonathan Pompa, Long Beach, CA (US); Dylan Owens, San Jose, CA (US); Richard Jenkins, Alameda, CA (US)

(73) Assignee: Hadal, Inc., Oakland, CA (US)

( * ) Notice: Subject to any disclaimer, the term of this patent is extended or adjusted under 35 U.S.C. 154(b) by 0 days.

(21) Appl. No.: 14/210,060

(22) Filed: Mar. 13, 2014

(65) Prior Publication Data

US 2014/0261138 A1 Sep. 18, 2014

Related U.S. Application Data

(60) Provisional application No. 61/792,708, filed on Mar. 15, 2013.

(51) Int. Cl.
*B63G 8/39* (2006.01)
*B63G 8/00* (2006.01)
(Continued)

(52) U.S. Cl.
CPC .............. *B63B 35/40* (2013.01); *B22D 31/00* (2013.01); *B29C 44/3415* (2013.01); *B63B 3/13* (2013.01); *B63B 27/16* (2013.01); *B63B 27/36* (2013.01); *B63G 8/00* (2013.01); *B63G 8/001* (2013.01); *B63G 8/39* (2013.01); *F17C 1/00* (2013.01);
(Continued)

(58) Field of Classification Search
CPC .................... B63G 8/00; B63G 8/39

USPC ........................................................ 114/312
See application file for complete search history.

(56) References Cited

U.S. PATENT DOCUMENTS 2,727,485 A * 12/1955 Combs .......................... 114/321
2,972,324 A * 2/1961 Williams ....................... 114/163
(Continued)

FOREIGN PATENT DOCUMENTS

EP 0016716 A1 10/1980
EP 0350332 1/1990
(Continued)

OTHER PUBLICATIONS

Hegrenaes, et al., "Doppler water-track aided inertial navigation for autonomous underwater vehicle", Oceans 2009, IEEE, Piscataway, NJ.

*Primary Examiner* — Lars A Olson
*Assistant Examiner* — Jovon Hayes
(74) *Attorney, Agent, or Firm* — Ropes & Gray LLP

(57) ABSTRACT

Systems and methods for a robust underwater vehicle are described herein. A robust underwater vehicle may include a force-limiting coupler connecting an actuation system to an actuation fin. The force-limiting coupler may be configured to break away from the actuation system upon receiving a threshold force. The robust underwater vehicle may also comprise hull sections connected by a threaded turnbuckle. Carbon-fiber axial strength members may mate with the threaded turnbuckle to pull the hull sections together to a specified preload tension. The robust underwater vehicle may also include a blazed sonar array protected by a carbon fiber bow including a plurality of slits. The plurality of slits may provide significant protection to the sonar array while simultaneously allowing one or more transducers to transmit sonar signals in a two-dimensional plane.

19 Claims, 13 Drawing Sheets

(51) Int. Cl.

| | | |
|---|---|---|
| *B63B 35/40* | (2006.01) | |
| *B22D 31/00* | (2006.01) | |
| *F17C 1/00* | (2006.01) | |
| *B29C 44/34* | (2006.01) | |
| *B63B 3/13* | (2006.01) | |
| *H01M 2/02* | (2006.01) | |
| *H01M 10/052* | (2010.01) | |
| *H01M 10/42* | (2006.01) | |
| *B63B 27/16* | (2006.01) | |
| *B63B 27/36* | (2006.01) | |
| *G01S 7/52* | (2006.01) | |
| *G01S 15/10* | (2006.01) | |
| *G01S 15/60* | (2006.01) | |
| *G01S 15/02* | (2006.01) | |
| *G01S 15/58* | (2006.01) | |
| *G01S 15/89* | (2006.01) | |

(52) U.S. Cl.
CPC ............ *G01S 7/52004* (2013.01); *G01S 15/02* (2013.01); *G01S 15/104* (2013.01); *G01S 15/588* (2013.01); *G01S 15/60* (2013.01); *H01M 2/024* (2013.01); *H01M 2/025* (2013.01); *H01M 10/052* (2013.01); *H01M 10/4257* (2013.01); *B63B 2027/165* (2013.01); *B63B 2035/405* (2013.01); *B63G 2008/004* (2013.01); *B63G 2008/008* (2013.01); *G01S 15/107* (2013.01); *G01S 15/8904* (2013.01); *Y10T 29/49117* (2015.01); *Y10T 29/49826* (2015.01); *Y10T 29/49893* (2015.01); *Y10T 29/49989* (2015.01); *Y10T 29/5176* (2015.01); *Y10T 428/1352* (2015.01); *Y10T 428/1376* (2015.01)

(56) References Cited

U.S. PATENT DOCUMENTS

| | | | | |
|---|---|---|---|---|
| 3,093,105 | A | * | 6/1963 | Rebikoff .................. 114/332 |
| 3,818,853 | A | * | 6/1974 | Taboultier et al. ............ 114/170 |
| 3,832,965 | A | * | 9/1974 | Walker .................. 114/321 |
| 4,158,189 | A | * | 6/1979 | Wardle .................. 367/153 |
| 4,244,026 | A | | 1/1981 | Dickey, Jr. |
| 4,421,050 | A | * | 12/1983 | Weinert .................. 114/256 |
| 5,549,065 | A | * | 8/1996 | Cipolla et al. ................ 114/23 |
| 6,640,740 | B1 | * | 11/2003 | French et al. ................ 114/330 |
| 7,128,294 | B2 | | 10/2006 | Roeseler et al. |
| 2007/0025184 | A1 | | 2/2007 | Scoca et al. |
| 2009/0238042 | A1 | | 9/2009 | Hawkinson et al. |
| 2014/0261138 | A1 | * | 9/2014 | Rikoski et al. ................ 114/312 |

FOREIGN PATENT DOCUMENTS

| | | | |
|---|---|---|---|
| EP | 2469507 | A1 | 6/2012 |
| GB | 191502000 | A | 0/1915 |
| GB | 2164612 | | 3/1986 |
| WO | WO-97/47990 | A1 | 12/1997 |

* cited by examiner

SYSTEMS AND METHODS FOR A ROBUST UNDERWATER VEHICLE

CROSS-REFERENCE TO RELATED APPLICATIONS

This application claims the benefit of U.S. Provisional Application Ser. No. 61/792,708, filed Mar. 15, 2013, the contents of which are incorporated by reference herein in their entirety.

BACKGROUND

Underwater vehicles are typically controlled using actuated fins that protrude from the vehicle into the flow field around the hull. If the fins on the vehicle come into contact with a foreign object moving with a different velocity than the vehicle, the inertia of the vehicle can cause extremely high forces to develop on the fin, coupling, and actuation system. In order to prevent transmission of these forces into the structure of the vehicle and limit damage to the actuators driving the fins, there exists a need for a force limiting coupler between the actuation system and the fin.

Furthermore, the hull of an underwater vehicle is typically designed and manufactured in separate sections. The separate hull sections typically are joined by metal rings that are bonded to the hull by adhesives or fasteners. However, hull sections made out of composite materials generally cannot accommodate sharp angles as well as metal, making it difficult to use trapezoidal cross section band clamps typically used on torpedoes. Moreover, since underwater vehicles are generally engineered to be similar in density to water, any saved weight can translate to greater buoyancy, greater payload volume, and lower manufacturing and operating costs. Thus, these hull interfaces present an opportunity to design a robust underwater vehicle with a joint geometry that is light, low cost, strong, and relatively rigid.

Forward looking sonar arrays also present an opportunity to increase robustness of underwater vehicles. Most forward looking sonars are precariously placed in the front of a vehicle and are often destroyed in the event of a collision. Furthermore, a front-mounted sonar array typically results in a planar-shaped bow section, which may expose the sonar to damage. Moreover, the hydrodynamics of the vehicle are often disrupted due to the planar bow shape and the constraints of the sonar (planar boxes to accommodate planar arrays, etc). Thus, there exists a need to design a robust underwater vehicle with improved protection for forward-facing sonar arrays.

SUMMARY

Systems and methods for a robust underwater vehicle are described herein. According to one aspect, an underwater vehicle comprising a hull, an actuation system connected to the hull, and a fin configured to steer the vehicle is described. The fin may be connected to the actuation system using a force-limiting coupler. In some embodiments, the force-limiting coupler may be configured to break away from the actuation system upon receiving a threshold force. The force-limiting coupler may be made from bronze, brass, plastic, or any other suitable material.

In some embodiments, the force-limiting coupler may comprise a hollow rod with at least one circumferential notch. The circumferential notch may be designed to fracture and break at or above a predetermined force threshold.

In alternate embodiments, the force-limiting coupler may comprise a truncated cone with a flange, and the force-limiting coupler may include a score line along the intersection of the flange and the truncated cone. The score line may be designed to fracture, tear, or break at or above a predetermined force threshold. The force-limiting coupler may further comprise a hollow truncated cone attached to the actuation system, wherein the truncated cone with the flange and the hollow truncated cone are aligned axially. The truncated cone with the flange may be configured to push into the hollow truncated cone upon receiving an axial force. In some embodiments, the fin is designed to separate and reconnect to the force-limiting coupler.

In some embodiments, the force-limiting coupler may be attached to the fin and/or the actuation system using adhesive, fasteners, live hinges, or any other suitable connector. The force-limiting coupler may be stiff in bending and rotation with respect to the actuation system, but may be designed to fracture, break, tear, or separate from the fin and/or the actuation upon receiving a threshold force. The threshold force may be designed to be below a damage threshold of a component of the underwater vehicle, such as the actuation system.

According to another aspect, an underwater vehicle is described comprising a first hull section including a first axial strength member, a first pressure-bearing face connected to the first hull section aligned adjacent to the first axial strength member, a second hull section including a second axial strength member, second pressure-bearing face connected to the first hull section aligned adjacent to the second axial strength member, and a threaded turnbuckle. The threaded turnbuckle may be configured to mate with the first and the second axial strength member. The threaded turnbuckle may be configured to pull the first and the second hull section together to a specified preload tension. In some embodiments, the axial strength members are composed of carbon fiber.

According to another aspect, an underwater vehicle is described comprising a carbon fiber bow, wherein the carbon fiber bow includes a plurality of slits, and a blazed sonar array comprising a plurality of transducers. The blazed sonar array may be aligned to transmit through at least one of the plurality of slits. In some embodiments, the plurality of transducers are oriented to be substantially parallel to the curvature of the carbon fiber bow, and at least two of the plurality of transducers may be oriented into or tangential to a parabola shape. In some embodiments, the plurality of transducers may be oriented to transmit a sonar signal in a two-dimensional plane. In some embodiments, at least one of the transducers may be oriented orthogonally to another transducer. For example, one transducer may be oriented horizontally and another transducer may be oriented vertically. In another embodiment, the transducers may be oriented to image planes with a common intersection which is the centerline of the vehicle.

Other objects, features, and advantages of the present invention will become apparent upon examining the following detailed description, taken in conjunction with the attached drawings.

BRIEF DESCRIPTION OF THE FIGURES

The systems and methods described herein are set forth in the appended claims. However, for purpose of explanation, several illustrative embodiments are set forth in the following figures.

DETAILED DESCRIPTION

Figure 1:
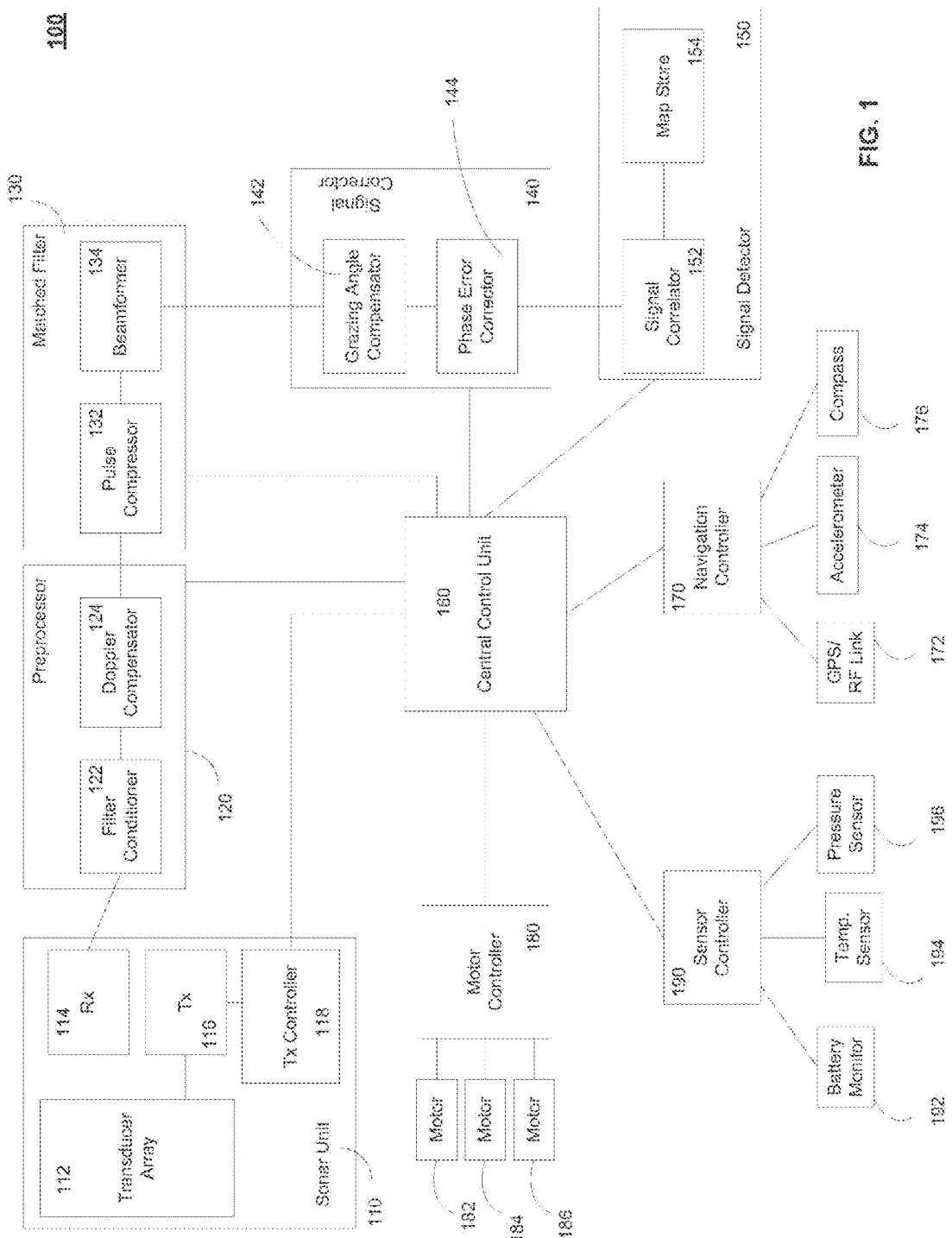
FIG. 1 is a block diagram depicting an exemplary remote vehicle, according to an illustrative embodiment of the present disclosure.

To provide an overall understanding of the invention, certain illustrative embodiments will now be described. However, it will be understood by one of ordinary skill in the art that the systems and methods described herein can be adapted and modified for other suitable applications and that such other additions and modifications will not depart from the scope hereof.

Systems and methods are described herein for a robust underwater vehicle. According to one aspect, a force-limiting coupler is described that may connect a fin to an actuator system of the underwater vehicle. In order to prevent transmission of potentially damaging forces into the structure of the vehicle and limit damage to the actuators driving the fins, a force limiting coupler may separate from the underwater vehicle upon receiving a force above a predetermined threshold.

In some embodiments, the force-limiting coupler may comprise a notched brass tube. In another embodiment, the force-limiting coupler may comprise a scored plastic disk. In each case, the coupler is stiff in rotation and bending until a brittle failure occurs, and the fin is allowed to break away at a controlled force higher than the designed hydrodynamic loading in normal operation but below the damage threshold of other components. The brass tube may be a hexagonal rod with a hollow bore that fastens or is bonded into a pocket in the fin and into the driving shaft from the actuator. The tube between the fin and the actuator may be circumferentially notched to create a stress concentration. The diameter and sharpness of the notch may be designed to cause fracture and therefore loss of strength at a desired bending load. The fin may also be designed to separate and reattach to the force-limiting coupler.

In some embodiments, the force-limiting coupler may comprise a truncated cone with a flange. The force-limiting coupler may be machined of a single piece of material and attached by adhesive or fasteners to a fin. An offset mating hollow truncated cone may be attached to the actuator. In some embodiments, the flange of the fin-side cone may have a score line on the flange to create a stress concentration. The depth and sharpness of the score line may be designed to cause fracture, tearing, or breaking at or above a predetermined force. The flange may fasten to the actuator side with living hinges, fasteners, or any other suitable connector. Under bending stress, the cone may break out of the flange by tearing or fracturing at the score line. In such embodiments, the very large diameter score ring may make the fin attachment relatively stiff right up to the breaking point. For example, small deflections at the outer diameter prior to breaking may create only very minor changes in angle of the fin. This geometry may also allow the cones to be manufactured such that there is a gap between them axially. In such embodiments, an axial impact may push the fin-side cone into the actuator-side cone and break the flange free. If the outer end of the fin is designed with a slope relative to the axis, the fin may pivot out of the way once the flange is broken and reduce the force transmitted axially to the actuator, preventing damage.

According to another aspect, a robust underwater vehicle is described comprising a first hull section connected to a second hull section using a threaded turnbuckle. In some embodiments, axial strength members may be composed of carbon fiber composite material and may be joined to the composite hull skin. The axial strength members may also be composed of carbon fiber, fiberglass, quartz, Kevlar, graphene, or any other high strength and/or anisotropic material. The axial strength members may have ends with eyes to accommodate pins that join them to the turnbuckles. In some embodiments, each hull section may have a pressure bearing face that butts against its adjacent section(s). In some embodiments, one of the two sections at each joint may have a tapered lip to guide assembly and support shear at the joint. The hull section may also have features to index the joint alignment rotationally if the hull is circular in cross section.

Access to the turnbuckles may be provided from the outside of the hull by creation of openings in the composite skin. These openings may expose the ends of the axial strength members, the turnbuckle, and/or its joining pins. The openings may be covered with fairing pieces when the vehicle is in operation. In some embodiments, the joining pins may be removed so that the turnbuckles can be separated from the sections without being completely unscrewed. The pins may be retained by a flap or tab when the turnbuckle is not tensioned. In some embodiments, the turnbuckle may pull the sections together axially to a specified preload tension, creating a solid and joined vehicle hull.

In some embodiments, bulkheads for structural rigidity and mounting can be included in the hull composite structure and biased to one side of a joint or another so that internal components can be loaded axially into separated sections on the side that does not have the bulkhead. This configuration may significantly increase the size of components that can be loaded, leading to low cost of manufacturing and high packing efficiency of components in the hull.

According to another aspect, a robust underwater vehicle may include a sonar array, such as a blazed sonar array, a non-blazed array sonar, or a squinted sonar. The classical blazed array consists of a pair of staves (also referred to herein as transducers) inside a rectangular rubber boot. Most forward looking sonars are precariously placed in the front of a vehicle and are often destroyed in the event of a collision. Furthermore, a front-mounted sonar array typically results in a planar-shaped bow section, which may expose the sonar to damage. Moreover, the hydrodynamics of the vehicle are often disrupted due to the planar bow shape and the constraints of the sonar (planar boxes to accommodate planar arrays, etc).

However, blazed array sonars do not typically operate at broadside; they are designed to transmit and receive over a range of squint angles. Blazed array staves can also be placed with a degree of flexibility. In some embodiments, a forward looking blazed sonar array may be positioned to line the sides of a vehicle with staves so that the staves are approximately arranged in a parabola. The array may be protected by hiding the array behind a carbon fiber bow with narrow slits. By being placed in a parabola, the arrangement is more compatible with a low drag bow, rather than a flat planar shape. Also, by arranging the arrays end-to-end rather than stacking them, the hole in the bow becomes longer and narrower, making it more difficult for large objects to impact the arrays. In some embodiments, the staves may be arranged to image in multiple planes. In some embodiments, the staves may be configured to image a horizontal plane and a vertical slice. The slits may be sufficiently narrow to provide significant protection to the sonar array while simultaneously allowing each stave sufficient space to image in a two-dimensional plane. The slit may be smaller than a golf ball, or, in some embodiments, a barnacle-encrusted golf ball.

FIG. 1 is a block diagram depicting an illustrative remote vehicle, according to an illustrative embodiment of the present disclosure. The system 100 includes a sonar unit 110 for sending and receiving sonar signals, a preprocessor 120 for conditioning a received (or reflected) signal, and a matched filter 130 for performing pulse compression and beamforming. The system 100 is configured to allow for navigating using high-frequency (greater than about 100 kHz) sonar signals. To allow for such HF navigation, the system 100 includes a signal corrector 140 for compensating for grazing angle error and for correcting phase error. The system 100 also includes a signal detector 150 for coherently correlating a received image with a map. In some embodiments, the system 100 includes an on-board navigation controller 170, motor controller 180 and sensor controller 190. The navigation controller 170 may be configured to receive navigational parameters from a GPS/RF link 172 (when available), an accelerometer 174, a gyroscope, and a compass 176. The motor controller 180 may be configured to control a plurality of motors 182, 184 and 186 for steering the vehicle. The sensor controller 190 may receive measurements from the battery monitor 172, a temperature sensor 194 and a pressure sensor 196. The system 100 further includes a central control unit (CCU) 160 that may serve as a hub for determining navigational parameters based on sonar measurements and other navigational and sensor parameters, and for controlling the movement of the vehicle.

In the context of a surface or underwater vehicle, the CCU 160 may determine navigational parameters such as position (latitude and longitude), velocity (in any direction), bearing, heading, acceleration and altitude. The CCU 160 may use these navigational parameters for controlling motion along the alongtrack direction (fore and aft), acrosstrack direction (port and starboard), and vertical direction (up and down). The CCU 160 may use these navigational parameters for controlling motion to yaw, pitch, roll or otherwise rotate the vehicle. During underwater operation, a vehicle such as an automated underwater vehicle (AUV) may receive high-frequency real aperture sonar images or signals at sonar unit 110, which may then be processed, filtered, corrected, and correlated against a synthetic aperture sonar (SAS) map of the terrain. Using the correlation, the CCU may then determine the AUV's position, with high-precision and other navigational parameters to assist with navigating the terrain. The precision may be determined by the signal and spatial bandwidth of the SAS map and/or the acquired sonar image. In certain embodiments, assuming there is at least a near perfect overlap of the sonar image with a prior SAS map with square pixels, and assuming that the reacquisition was performed with a single channel having a similar element size and bandwidth, and assuming little or no losses to grazing angle compensation, the envelope would be about one-half the element size. Consequently, in certain embodiments, the peak of the envelope may be identified with high-precision, including down to the order of about $\frac{1}{100}^{th}$ of the wavelength. For example, the resolution may be less than 2.5 cm, or less than 1 cm or less than and about 0.1 mm in the range direction.

As noted above, the system 100 includes a sonar unit 110 for transmitting and receiving acoustic signals. The sonar unit includes a transducer array 112 having a one or more transmitting elements or projectors and a plurality of receiving elements arranged in a row. In certain embodiments the transducer array 112 includes separate projectors and receivers. The transducer array 112 may be configured to operate in SAS mode (either stripmap or spotlight mode) or in a real aperture mode. In certain embodiments, the transducer array 112 is configured to operate as a multibeam echo sounder, sidescan sonar or sectorscan sonar. The transmitting elements and receiving elements may be sized and shaped as desired and may be arranged in any configuration, and with any spacing as desired without departing from the scope of the present disclosure. The number, size, arrangement and operation of the transducer array 112 may be selected and controlled to insonify terrain and generate high-resolution images of a terrain or object. One example of an array 112 includes a 16 channel array with 5 cm elements mounted in a 12¾ inch vehicle.

The sonar unit 110 further includes a receiver 114 for receiving and processing electrical signals received from the transducer, and a transmitter 116 for sending electrical signals to the transducer. The sonar unit 110 further includes a transmitter controller 118 for controlling the operation of the transmitter including the start and stop, and the frequency of a ping.

The signals received by the receiver 114 are sent to a preprocessor for conditioning and compensation. Specifically, the preprocessor 120 includes a filter conditioner 122 for eliminating outlier values and for estimating and compensating for hydrophone variations. The preprocessor further includes a Doppler compensator 124 for estimating and compensating for the motion of the vehicle. The preprocessed signals are sent to a matched filter 130.

The matched filter 130 includes a pulse compressor 132 for performing matched filtering in range, and a beamformer 134 for performing matched filtering in azimuth and thereby perform direction estimation.

The signal corrector 140 includes a grazing angle compensator 142 for adjusting sonar images to compensate for differences in grazing angle. Typically, if a sonar images a collection of point scatterers the image varies with observation angle. For example, a SAS system operating at a fixed altitude and heading observing a sea floor path will produce different images at different ranges. Similarly, SAS images made at a fixed horizontal range would change if altitude were varied. In such cases, changes in the image would be due to changes in the grazing angle. The grazing angle compensator 142 is configured to generate grazing angle invariant images. One such grazing angle compensator is described in U.S. patent application Ser. No. 12/802,454 titled "Apparatus and Method for Grazing Angle Independent Signal Detection," the contents of which are incorporated herein by reference in their entirety.

The signal corrector 140 includes a phase error corrector 144 for correcting range varying phase errors. Generally, the phase error corrector 144 breaks the image up into smaller pieces, each piece having a substantially constant phase error. Then, the phase error may be estimated and corrected for each of the smaller pieces.

The system 100 further includes a signal detector 150 having a signal correlator 152 and a storage 154. The signal detector 150 may be configured to detect potential targets, estimate the position and velocity of a detected object and perform target or pattern recognition. In one embodiment, the storage 154 may include a map store, which may contain one or more previously obtained SAS images real aperture images or any other suitable sonar image. The signal correlator 152 may be configured to compare the received and processed image obtained from the signal corrector 140 with one or more prior images from the map store 154.

The system 100 may include other components, not illustrated, without departing from the scope of the present disclosure. For example, the system 100 may include a data logging and storage engine. In certain embodiments the data logging and storage engine may be used to store scientific data which may then be used in post-processing for assisting with navigation. The system 100 may include a security engine for controlling access to and for authorizing the use of one or more features of system 100. The security engine may be configured with suitable encryption protocols and/or security keys and/or dongles for controlling access. For example, the security engine may be used to protect one or more maps stored in the map store 154. Access to one or more maps in the map store 154 may be limited to certain individuals or entities having appropriate licenses, authorizations or clearances. Security engine may selectively allow these individuals or entities access to one or more maps once it has confirmed that these individuals or entities are authorized. The security engine may be configured to control access to other components of system 100 including, but not limited to, navigation controller 170, motor controller 180, sensor controller 190, transmitter controller 118, and CCU 160.

Figure 2:
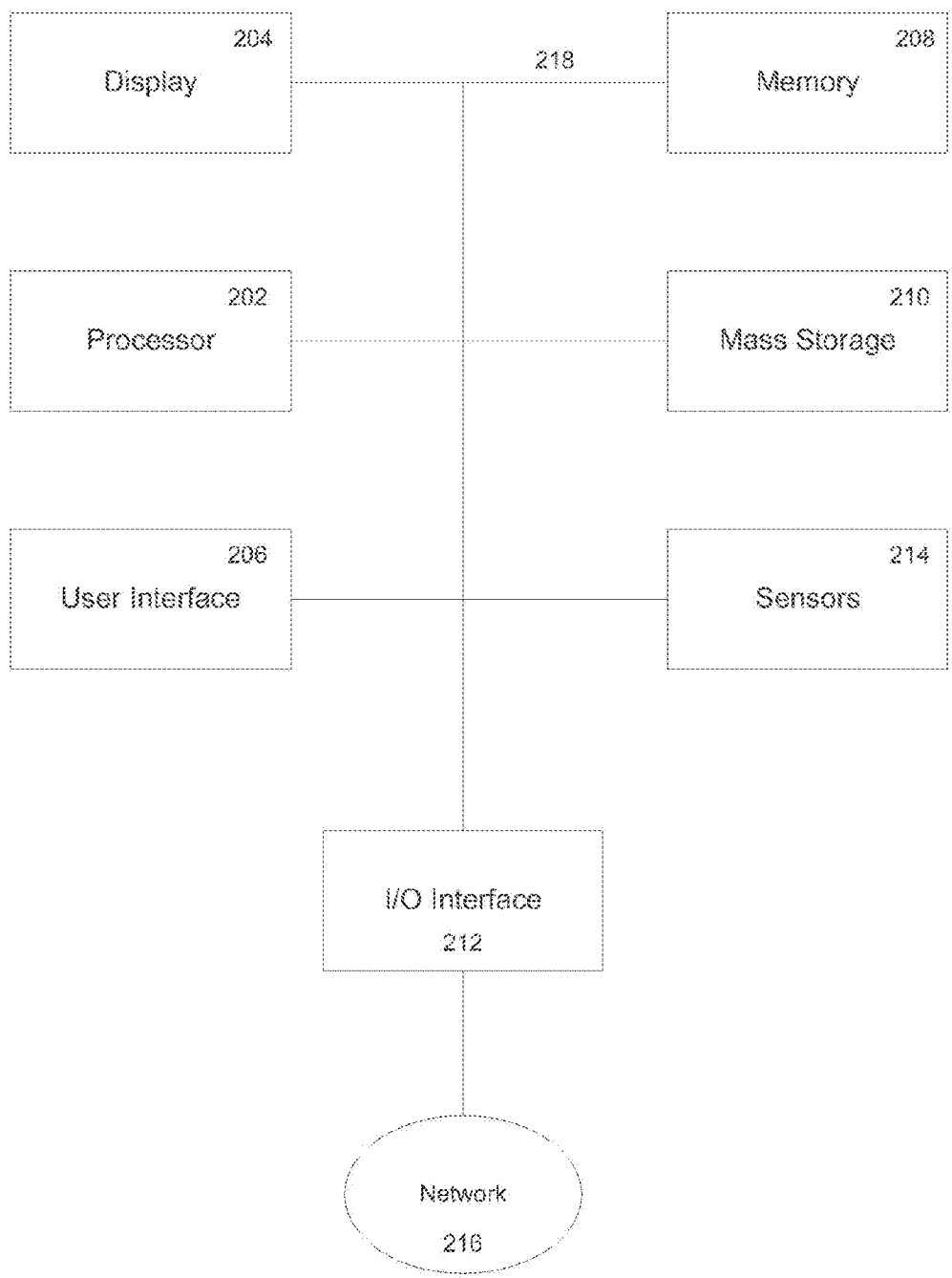
FIG. 2 is block diagram of an exemplary computer system for implementing at least a portion of the systems and methods described in the present disclosure.

Generally, with the exception of the transducer 112, the various components of system 100 may be implemented in a computer system, such as computer system 200 of FIG. 2. More particularly, FIG. 2 is a functional block diagram of a general purpose computer accessing a network according to an illustrative embodiment of the present disclosure. The holographic navigation systems and methods described in this application may be implemented using the system 200 of FIG. 2.

The exemplary system 200 includes a processor 202, a memory 208, and an interconnect bus 218. The processor 202 may include a single microprocessor or a plurality of microprocessors for configuring computer system 200 as a multi-processor system. The memory 208 illustratively includes a main memory and a read-only memory. The system 200 also includes the mass storage device 210 having, for example, various disk drives, tape drives, etc. The main memory 208 also includes dynamic random access memory (DRAM) and high-speed cache memory. In operation and use, the main memory 208 stores at least portions of instructions for execution by the processor 202 when processing data (e.g., model of the terrain) stored in main memory 208.

In some embodiments, the system 200 may also include one or more input/output interfaces for communications, shown by way of example, as interface 212 for data communications via the network 216. The data interface 212 may be a modem, an Ethernet card or any other suitable data communications device. The data interface 212 may provide a relatively high-speed link to a network 216, such as an intranet, internet, or the Internet, either directly or through another external interface. The communication link to the network 216 may be, for example, any suitable link such as an optical, wired, or wireless (e.g., via satellite or 802.11 Wi-Fi or cellular network) link. In some embodiments, communications may occur over an acoustic modem. For instance, for AUVs, communications may occur over such a modem. Alternatively, the system 200 may include a mainframe or other type of host computer system capable of web-based communications via the network 216.

In some embodiments, the system 200 also includes suitable input/output ports or may use the Interconnect Bus 218 for interconnection with a local display 204 and user interface 206 (e.g., keyboard, mouse, touchscreen) or the like serving as a local user interface for programming and/or data entry, retrieval, or manipulation purposes. Alternatively, server operations personnel may interact with the system 200 for controlling and/or programming the system from remote terminal devices (not shown in the Figure) via the network 216.

In some embodiments, a system requires a processor, such as a navigational controller 170, coupled to one or more coherent sensors (e.g., a sonar, radar, optical antenna, etc.) 214. Data corresponding to a model of the terrain and/or data corresponding to a holographic map associated with the model may be stored in the memory 208 or mass storage 210, and may be retrieved by the processor 202. Processor 202 may execute instructions stored in these memory devices to perform any of the methods described in this application, e.g., grazing angle compensation, or high frequency holographic navigation.

The system may include a display 204 for displaying information, a memory 208 (e.g., ROM, RAM, flash, etc.) for storing at least a portion of the aforementioned data, and a mass storage device 210 (e.g., solid-state drive) for storing at least a portion of the aforementioned data. Any set of the aforementioned components may be coupled to a network 216 via an input/output (I/O) interface 212. Each of the aforementioned components may communicate via interconnect bus 218.

In some embodiments, the system requires a processor coupled to one or more coherent sensors (e.g., a sonar, radar, optical antenna, etc.) 214. The sensor array 214 may include, among other components, a transmitter, receive array, a receive element, and/or a virtual array with an associated phase center/virtual element.

Data corresponding to a model of the terrain, data corresponding to a holographic map associated with the model, and a process for grazing angle compensation may be performed by a processor 202. The system may include a display 204 for displaying information, a memory 208 (e.g., ROM, RAM, flash, etc.) for storing at least a portion of the aforementioned data, and a mass storage device 210 (e.g., solid-state drive) for storing at least a portion of the aforementioned data. Any set of the aforementioned components may be coupled to a network 216 via an input/output (I/O) interface 212. Each of the aforementioned components may communicate via interconnect bus 218.

In operation, a processor 202 receives a position estimate for the sensor(s) 214, a waveform or image from the sensor(s) 214, and data corresponding to a model of the terrain, e.g., the sea floor. In some embodiments, such a position estimate may not be received and the process performed by processor 202 continues without this information. Optionally, the processor 202 may receive navigational information and/or altitude information, and a processor 202 may perform a coherent image rotation algorithm. The output from the system processor 202 includes the position to which the vehicle needs to move to.

The components contained in the system 200 are those typically found in general purpose computer systems used as servers, workstations, personal computers, network terminals, portable devices, and the like. In fact, these components are intended to represent a broad category of such computer components that are well known in the art.

It will be apparent to those of ordinary skill in the art that methods involved in the systems and methods of the invention may be embodied in a computer program product that includes a non-transitory computer usable and/or readable medium. For example, such a computer usable medium may consist of a read only memory device, such as a CD ROM disk, conventional ROM devices, or a random access memory, a hard drive device or a computer diskette, a flash memory, a DVD, or any like digital memory medium, having a computer readable program code stored thereon.

Optionally, the system may include an inertial navigation system, a Doppler sensor, an altimeter, a gimbling system to fixate the sensor on a populated portion of a holographic map, a global positioning system (GPS), a long baseline (LBL) navigation system, an ultrashort baseline (USBL) navigation, or any other suitable navigation system.

Figure 3:
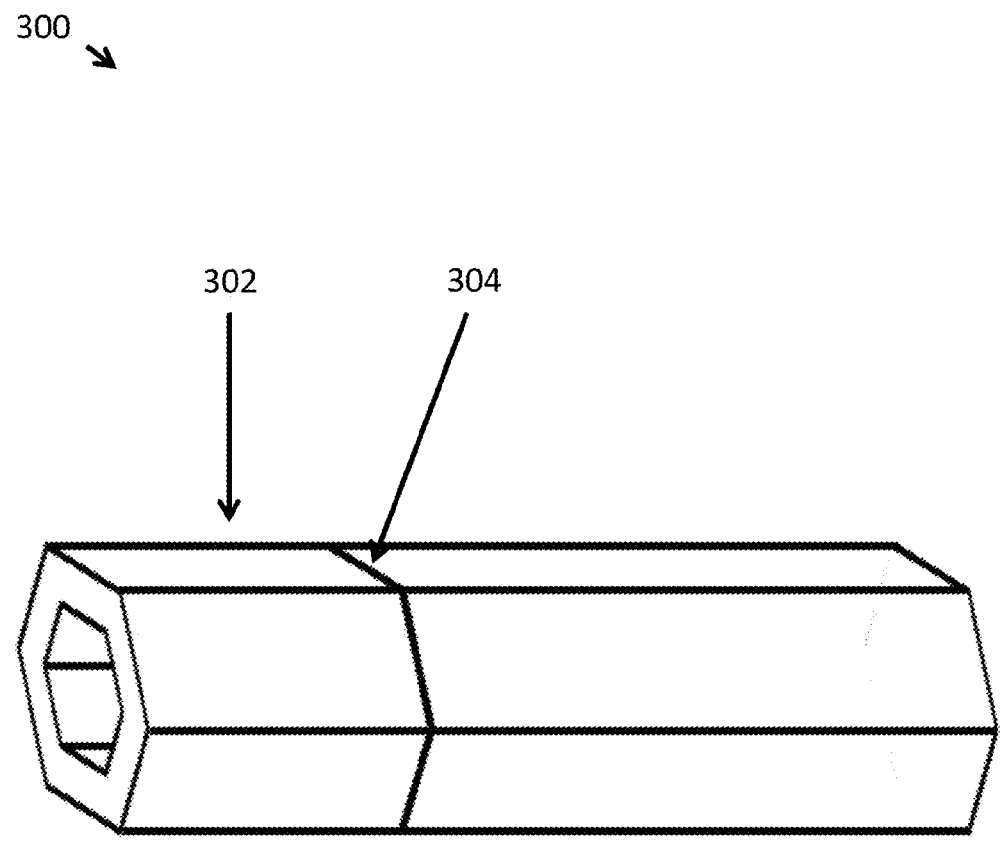
FIG. 3 depicts one illustrative embodiment of a force-limiting coupler.

FIG. 3 depicts one illustrative embodiment of a force-limiting coupler. The force-limiting coupler 300 may comprise a hollow tube 302 and a circumerential notch 304.

Although the hollow tube 302 is depicted as having a hexagonal shape in FIG. 3, the hollow tube 302 may have any suitable cross-section, including, but not limited to, rectangular, circular, oval, or splined. The hollow tube 302 may be made out of any suitable material, including, but not limited to, steel, aluminum, brass, bronze, or plastic.

The circumerential notch 304 may be located at any location along the length of hollow tube 302. In some embodiments, hollow tube 302 may have more than one circumerential notch. In some embodiments, the notch may follow a non-circumferential path. The circumferential notch 304 may have a predetermined depth, sharpness, and location. In some embodiments, the circumferential notch 304 may be designed to break at a predetermined force threshold. The predetermined force threshold may be determined by a damage threshold of other components of an underwater vehicle, such as the actuation system or the vehicle hull. The hollow tube 302 may be relatively stiff in bending and rotation until breakage occurs.

Figure 4:
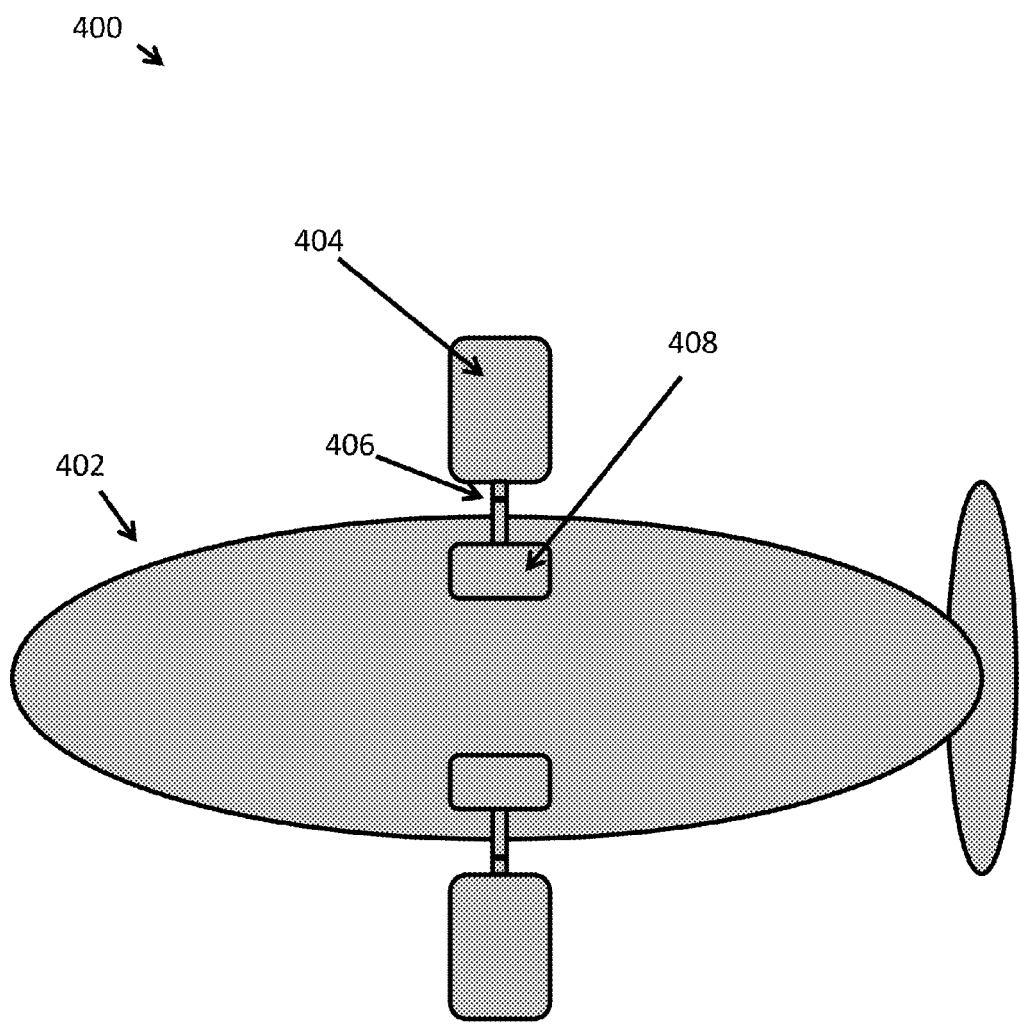
FIG. 4 depicts a vehicle with a fin attached using a force-limiting coupler, according to one illustrative embodiment.

FIG. 4 depicts a vehicle with a fin attached using a force-limiting coupler, according to one illustrative embodiment. System 400 includes vehicle 402, fin 404, force-limiting coupler 406, and actuation system 408.

Vehicle 402 may be any suitable vehicle, including, but not limited to, an AUV, a remotely operated vehicle (ROV), a buoy, an unmanned aerial vehicle (UAV), an autonomous surface vessel, or an exploratory robot. Vehicle 402 may include actuation system 408, which may be any suitable actuation system for controlling fin 404. As an illustrative example, actuation system 408 may comprise a motor or servo for tilting the fin 404 to varying degrees according to control inputs. The fin 404 may be any suitable shape for vehicle 402.

Fin 404 may be connected to the actuation system 408 using force-limiting coupler 406. In the illustrative example depicted in FIG. 4, the force-limiting coupler 406 is the force-limiting coupler 300 depicted in FIG. 3. As discussed above, the force-limiting coupler 406 may comprise a hollow tube with a circumferential notch that may be designed to break at a predetermined force threshold. The predetermined force threshold may be determined by a damage threshold of other components of an underwater vehicle, such as the actuation system 408 or the hull of vehicle 402. The force-limiting coupler 406 may be relatively stiff in bending and rotation until breakage occurs.

Figure 5A:
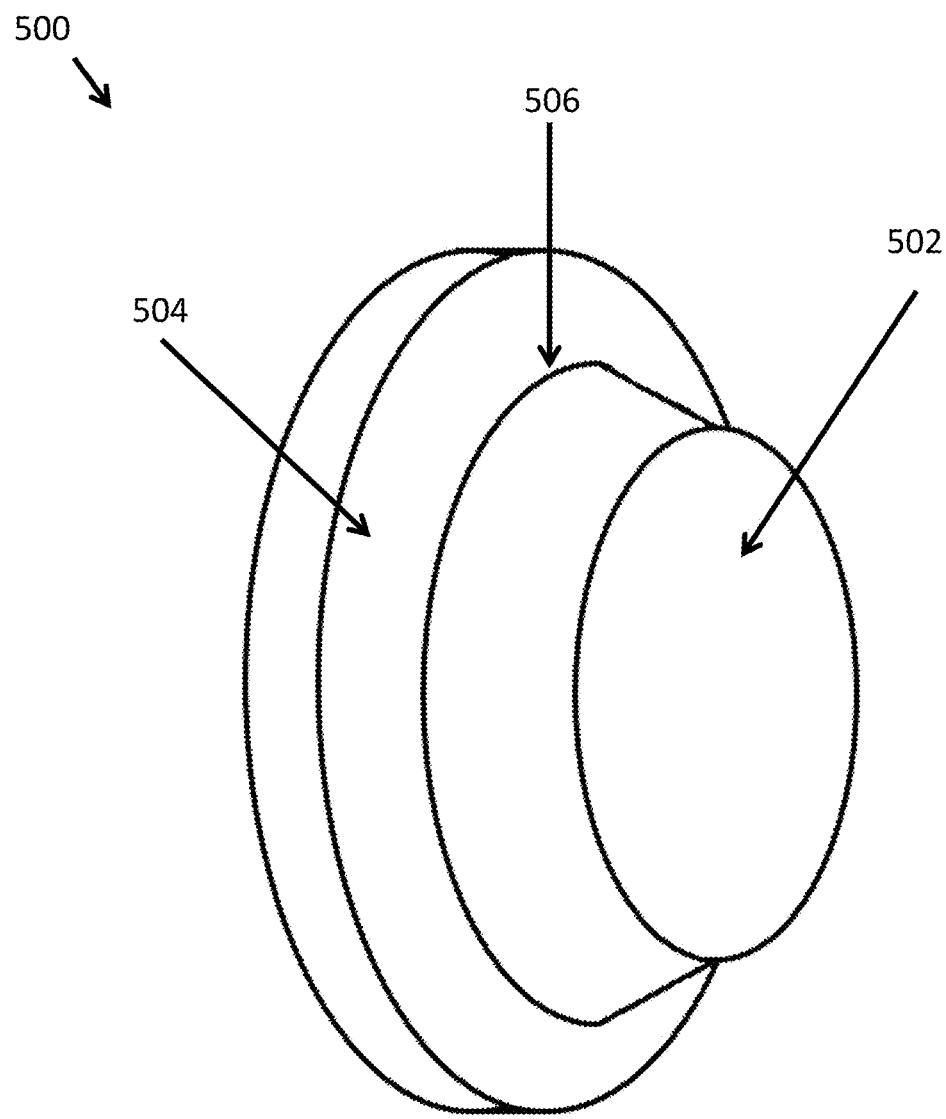
FIGS. 5A and B depict one illustrative embodiment of a force-limiting coupler.

FIG. 5A depicts one illustrative embodiment of a force-limiting coupler. Force-limiting coupler 500 includes truncated cone 502, flange 504, and scored line 506.

The truncated cone 502 and the flange 504 may be made from the same material and machined from a single piece. The truncated cone 502 and the flange 504 may be made out of any suitable material, including, but not limited to, steel, aluminum, brass, or plastic.

In some embodiments, the scored line 506 may be machined at the interface of the truncated cone 502 and the flange 504. In alternate embodiments, the scored line 506 may be machined at any circumference along the flange 504. In some embodiments, flange 504 may have more than one scored line at varying circumferences. The scored line 506 may have a predetermined depth, sharpness, and location. In some embodiments, the scored line 506 may be designed to fracture, tear, break, or separate at a predetermined force threshold. The predetermined force threshold may be determined by a damage threshold of other components of an underwater vehicle, such as the actuation system or the vehicle hull. The truncated cone 502 and/or the flange 504 may be relatively stiff in bending and rotation until breakage occurs.

Figure 5B:
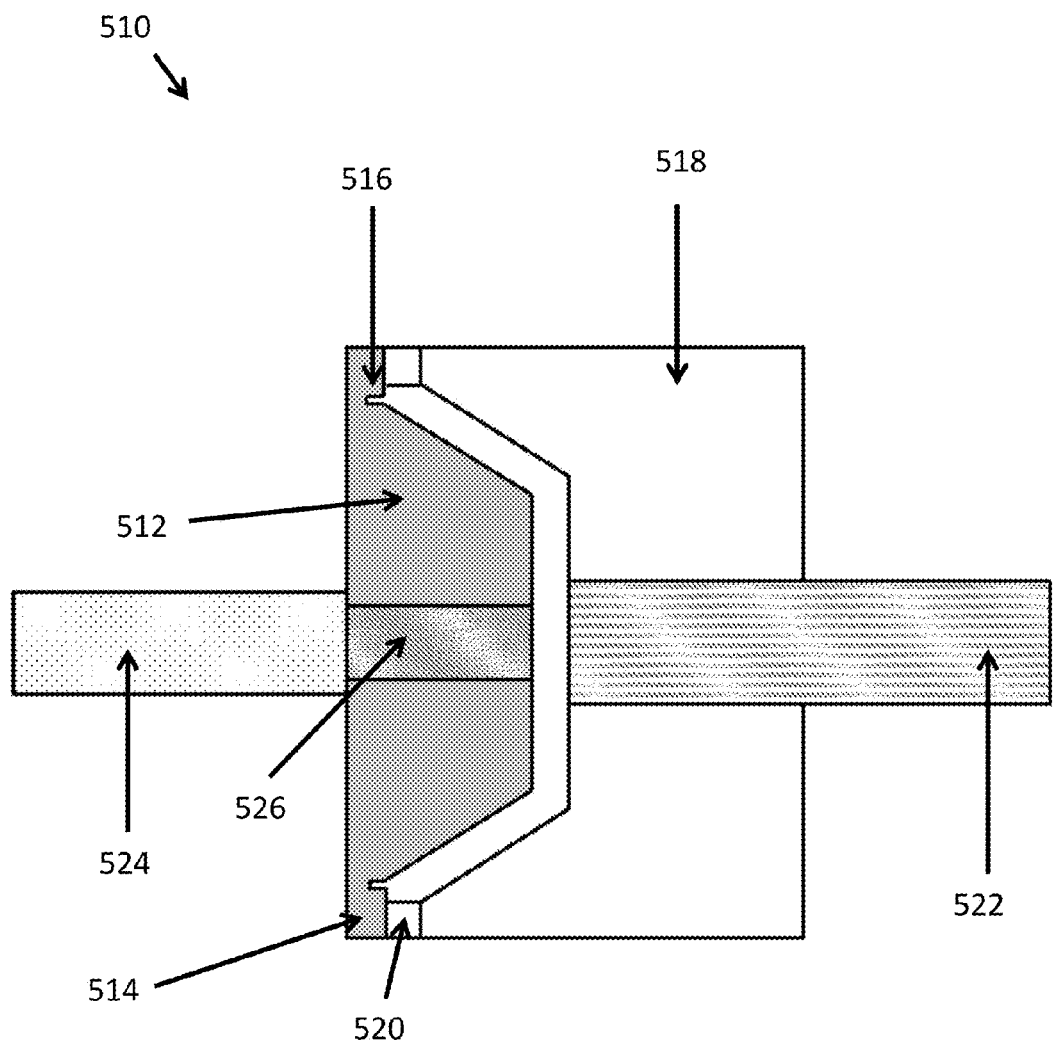

FIG. 5B depicts one illustrative embodiment of a force-limiting coupler. Force-limiting coupler 510 includes truncated cone 512, flange 514, scored line 516, hollow cone 518, connector 520, drive shaft 522, fin 524, and fin root 526.

Truncated cone 512, flange 514, and scored line 516 may be substantially similar to truncated cone 502, flange 504, and scored line 506 discussed in relation to FIG. 5A. Truncated cone 512 may attach to fin 524 using any suitable connector, such as adhesive or fasteners. In some embodiments, fin root 526 may be used to attach fin 524 to truncated cone 512.

Hollow cone 518 may be configured to mate with truncated cone 512. For example, truncated cone 512 may be designed to fit inside hollow cone 518. Hollow cone 518 may be made from the same, or different material as truncated cone 512. Hollow cone 518 may be attached to drive shaft 522, and drive shaft 522 may be connected to a vehicle actuation system. The flange 514 may fasten to the hollow cone 518 using connector 520. Connector 520 may be a living hinge, a fastener, or any other suitable connector. In some embodiments, flange 514 may attach directly to hollow cone 518 without the use of connector 520.

The truncated cone 512 and the hollow cone 518 may be positioned so that there is an axial gap between them. In such embodiments, an axial impact may push the truncated cone 512 into the hollow cone 518 and break the flange 514 free. If the outer end of the fin 524 is designed with a slope relative to the axis, the fin 524 may pivot out of the way once the flange 514 is broken and reduce the force transmitted axially to the actuator, preventing damage.

Figure 6:
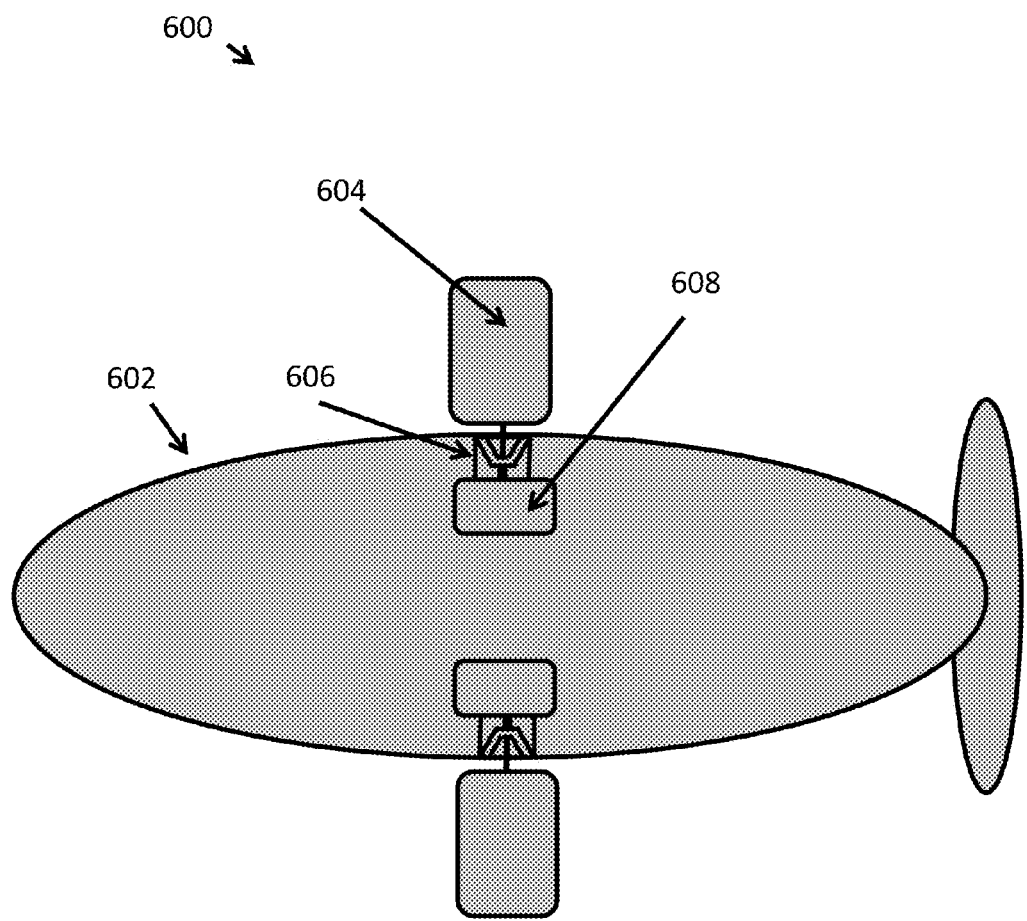
FIG. 6 depicts a vehicle with a fin attached using a force-limiting coupler, according to one illustrative embodiment.

FIG. 6 depicts a vehicle with a fin attached using a force-limiting coupler, according to one illustrative embodiment. System 600 includes vehicle 602, fin 604, a force-limiting coupler 606, and actuation system 608.

Vehicle 602 may be any suitable vehicle, including, but not limited to, an AUV, a remotely operated vehicle (ROV), a buoy, an unmanned aerial vehicle (UAV), an autonomous surface vessel, or an exploratory robot. Vehicle 602 may include actuation system 610, which may be any suitable actuation system for controlling fin 604. As an illustrative example, actuation system 608 may comprise a motor or servo for tilting the fin 604 to varying degrees according to control inputs. The fin 604 may be any suitable shape for vehicle 608.

Fin 604 may be connected to the actuation system 610 using a force-limiting coupler 606. Force-limiting coupler 606 may be substantially similar to the force-limiting coupler 510 depicted in FIG. 5B. As discussed above, the force-limiting coupler 606 may comprise a flange with a score line that may be designed to break at a predetermined force threshold. The predetermined force threshold may be determined by a damage threshold of other components of an underwater vehicle, such as the actuation system 608 or the hull of vehicle 602. The force-limiting coupler 606 may be relatively stiff in bending and rotation until breakage occurs.

As discussed in relation to FIG. 5B, the force-limiting coupler may comprise a truncated cone attached to the fin 604 and an offset mating hollow truncated cone attached to the actuator system 608. In such embodiments, an axial impact may push the truncated cone into the hollow cone on the actuator side and break the flange of the truncated cone free. If the outer end of the fin 604 is designed with a slope relative to the axis of the force-limiting coupler, the fin 604 may pivot out of the way once the flange is broken and reduce the force transmitted axially to the actuator system 608, preventing damage.

Figure 7A:
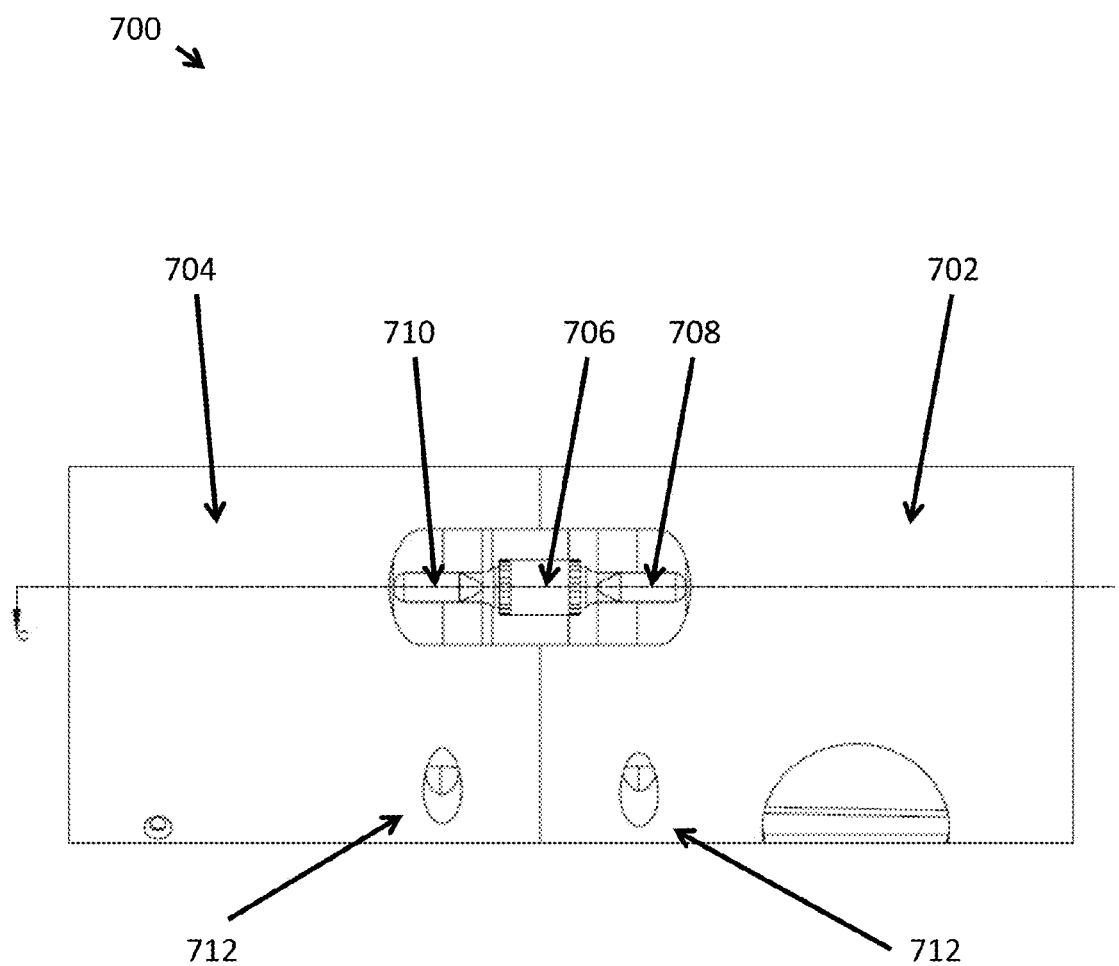
FIGS. 7A-C depict a vehicle with two hull sections connected using a turnbuckle, according to one illustrative embodiment.
Figure 7B:
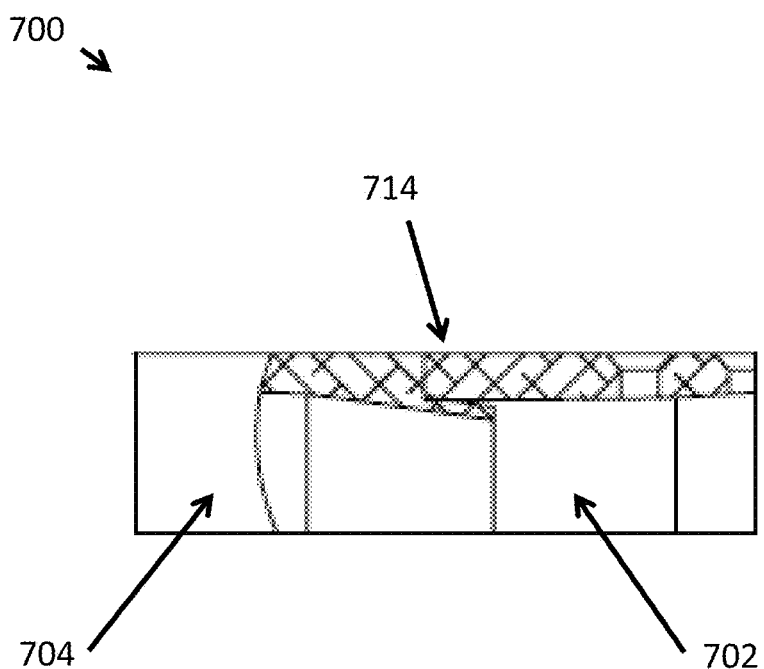
Figure 7C:
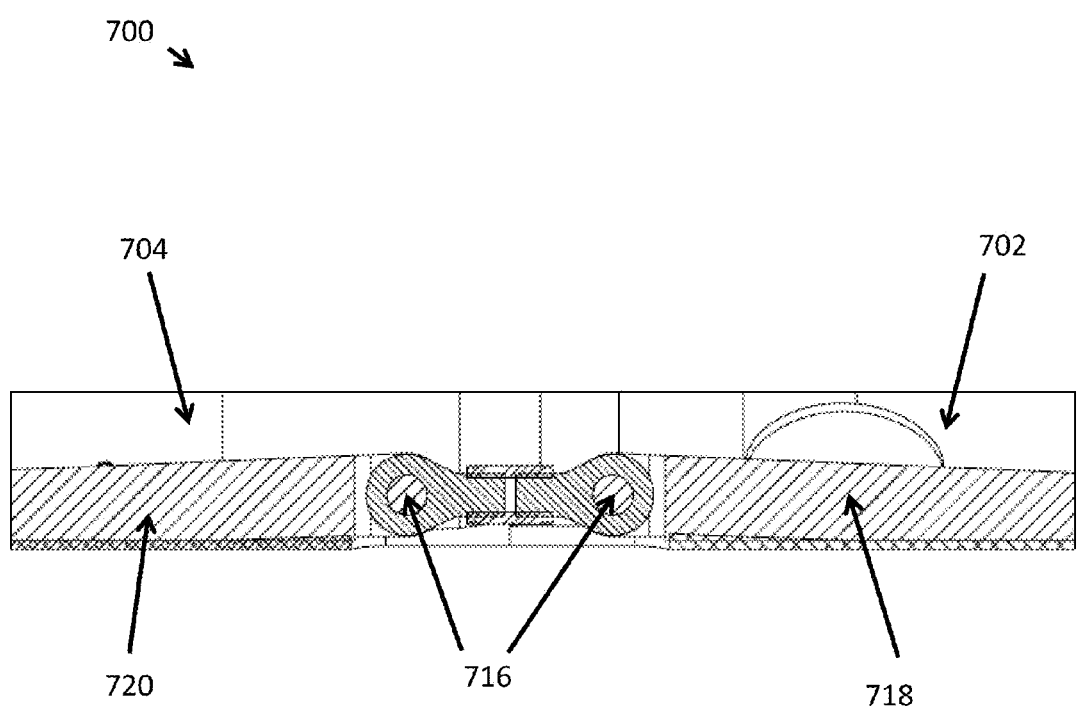

FIGS. 7A-C depict a vehicle with two hull sections connected using a turnbuckle, according to one illustrative embodiment. FIG. 7A depicts system 700 comprising a first hull section 702, a second hull section 704, a turnbuckle 706, a first axial strength member 708, a second axial strength member 710, and turnbuckle pin access holes 712.

The axial strength members 708 and 710 may be composed of carbon fiber composite material and may be joined to the composite hull skin. The axial strength members 708 and 710 may have ends with eyes to accommodate pins that join them to the turnbuckles. Access to the turnbuckles may be provided from the outside of the hull through turnbuckle pin access holes 712, which are openings in the composite skin. The access holes 712 may expose the ends of the axial strength members, the turnbuckle, and/or its joining pins. The access holes 712 may be covered with fairing pieces when the vehicle is in operation.

The axial strength members 708 and 710 may be configured to mate with threaded turnbuckle 706. The turnbuckle 706 may be configured to pull the hull sections 702 and 704 together axially to a specified preload tension, creating a solid and joined vehicle hull.

FIG. 7B depicts a top view of system 700, including the first hull section 702, the second hull section 704, and an overlapping section 714. In some embodiments, such as the illustrative embodiment depicted in FIG. 7B, first hull section 702 may have a tapered lip to guide assembly and support shear at the joint. Second hull section 704 may be designed to mate with the tapered lip of first hull section 702 in the overlapping section 714. In some embodiments, one or more of the hull sections 702 or 704 may also have features (not shown) to index the joint alignment rotationally if the hull is circular in cross section.

FIG. 7C depicts a cross-sectional view of system 700, including the first hull section 702, the second hull section 704, carbon fiber plates 718 and 720, and turnbuckle pins 716.

Access to the turnbuckle pins 716 may be provided by access holes 712, depicted in FIG. 7A. In some embodiments, the turnbuckle pins 716 may be removed so that the turnbuckle 706 can be separated from the sections 702 and 704 without being completely unscrewed. The pins 716 may be retained by a flap or tab when the turnbuckle 706 is not tensioned.

In some embodiments, each hull section 702 and 704 may have a carbon fiber plates 718 and 720 that butts against its adjacent section(s). The plates 718 and 720 may support their respective hull sections 702 and 704 when the turnbuckle 706 is axially tightened.

Figure 8A:
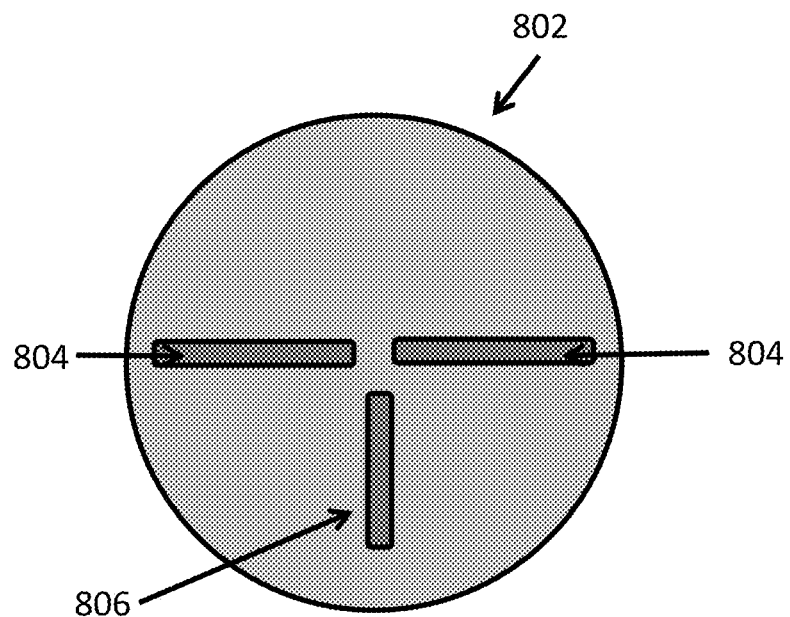
FIGS. 8A-C depict the bow section of a vehicle with slits for a blazed sonar array, according to one illustrative embodiment.
Figure 8B:
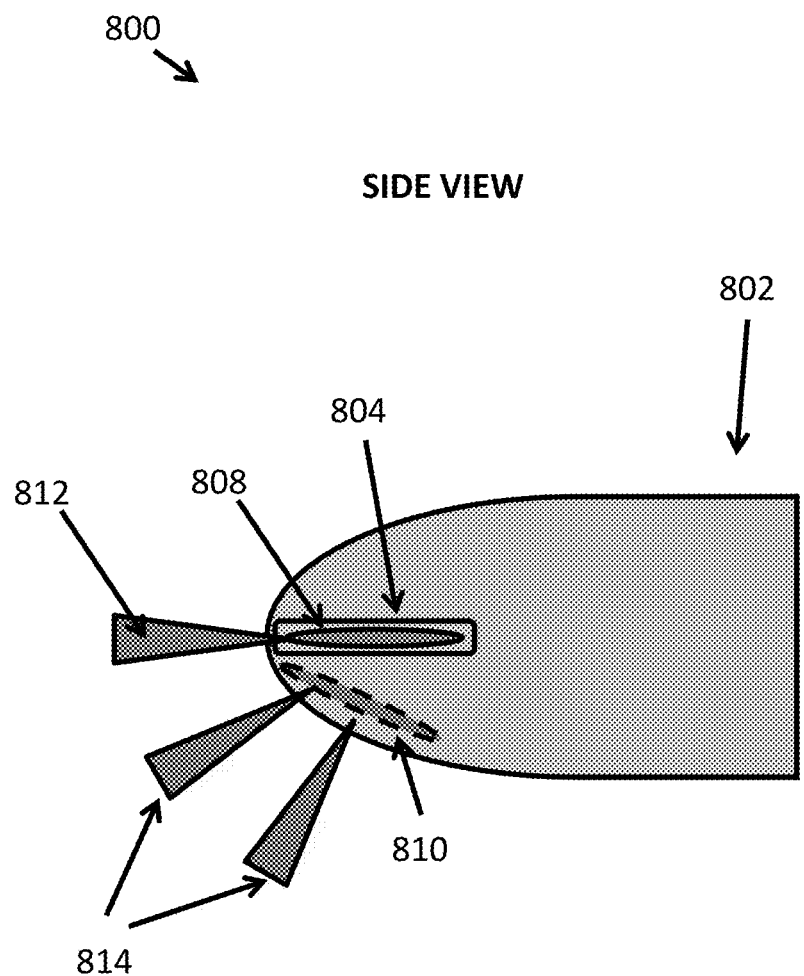
Figure 8C:
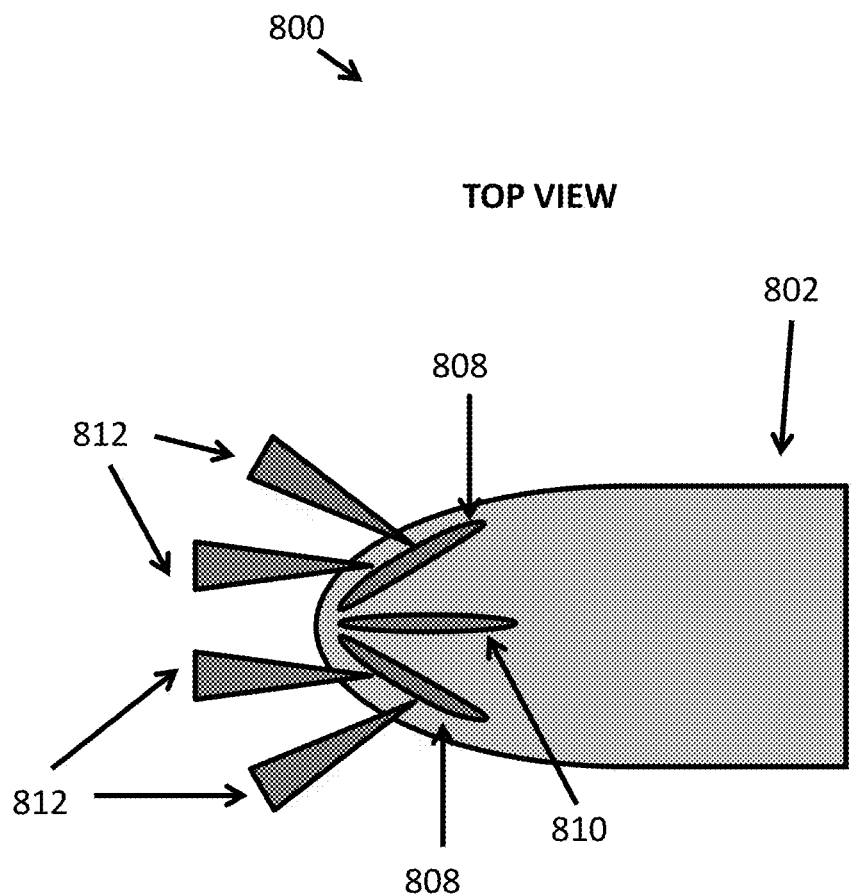

FIGS. 8A-C depict the bow section of a vehicle with slits for a blazed sonar array, according to one illustrative embodiment. FIG. 8A depicts system 800 including a front view of the bow section 802, horizontal slits 804, and vertical slit 806.

Bow section 802 may be made from carbon fiber, fiberglass, or any other suitable material. Although the slits 804 and 806 are depicted in a "T" pattern in FIG. 8A, bow section 802 may include any number of slits in any suitable configuration. Slits 804 and 806 may be aligned with sonar transducers which are contained within the bow section 802 (shown in connection with FIGS. 8B and 8C) and allow the sonar transducers to transmit sonar signals in a 2D plane. For example, horizontal slits 804 may allow their respective sonar transducers to sweep a substantially horizontal plane in front of the bow section 802, while vertical slit 806 may allow its respective sonar transducer to sweep a substantially vertical plane in front of bow section 802. In this manner, the slits 804 and 806 may be designed to provide significant protection to the sonar array while still allowing sonar signals to pass through the bow section 802.

FIG. 8B depicts a side view of system 800 including bow section 802, horizontal slit 804, horizontal transducer 808, vertical transducer 810, horizontal sonar signal 812, and vertical sonar signal 814.

As discussed above, the horizontal slit 804 may allow horizontal transducer 808 to transmit a horizontal sonar signal 812 in a relatively horizontal plane. Similarly, vertical transducer 810 may transmit a vertical sonar signal 814 through vertical slit 806 (not shown in FIG. 8B). Horizontal sonar signal 812 and vertical sonar signals 814 are depicted in FIG. 8B as illustrative examples and are not intended to represent actual shapes or ranges of sonar sweeps. Transducers 808 and 810 may be any suitable sonar equipment for transmitting and receiving sonar signals, as is typical for use in AUV or ocean applications. Transducers 808 and 810 may be configured to transmit and receive over a range of squint angles.

FIG. 8C depicts a top view of system 800 including bow section 802, horizontal transducers 808, vertical transducer 810, and horizontal sonar signals 812.

As discussed above, slits in the bow section 802 may allow horizontal transducers 808 and vertical transducer 810 to transmit and receive sonar signals through the bow section 802. Horizontal sonar signals 812 are depicted in FIG. 8C as illustrative examples and are not intended to represent actual shapes or ranges of sonar sweeps. In some embodiments, the transducers 808 and 810 may be shaped to follow the curvature of bow section 802. In some embodiments, horizontal transducers 808 and 810 may be positioned in a substantially parabolic arrangement. In this manner, the slits in bow section 802 may allow the transducers 808 and 810 to image in multiple planes while still providing significant protection to the transducers.

It will be apparent to those skilled in the art that such embodiments are provided by way of example only. It should be understood that numerous variations, alternatives, changes, and substitutions may be employed by those skilled in the art in practicing the invention. Accordingly, it will be understood that the invention is not to be limited to the embodiments disclosed herein, but is to be understood from the following claims, which are to be interpreted as broadly as allowed under the law.

What is claimed is:

1. An underwater vehicle, comprising:
a hull;
an actuation system connected to the hull; and
a fin configured to steer the vehicle, wherein the fin is connected to the actuation system using a force-limiting coupler, wherein the force-limiting coupler comprises a truncated cone with a flange, and wherein the force-limiting coupler includes a score line along the intersection of the flange and the truncated cone.

2. The underwater vehicle of claim 1, wherein the force-limiting coupler is configured to break away from the actuation system upon receiving a threshold force.

3. The underwater vehicle of claim 1, wherein the force-limiting coupler comprises a hollow rod with at least one circumferential notch.

4. The underwater vehicle of claim 3, wherein the force-limiting coupler is made from bronze.

5. The underwater vehicle of claim 1, wherein the force-limiting coupler is made from plastic.

6. The underwater vehicle of claim 1 further comprising a hollow truncated cone attached to the actuation system, wherein the truncated cone with the flange and the hollow truncated cone are aligned axially, and wherein the truncated cone with the flange is configured to push into the hollow truncated cone upon receiving an axial force.

7. The underwater vehicle of claim 1, wherein the force-limiting coupler is attached to the fin using adhesive.

8. The underwater vehicle of claim 1, wherein the force-limiting coupler is attached to the fin using fasteners.

9. The underwater vehicle of claim 1, wherein the force-limiting coupler is configured to undergo a brittle failure at a threshold force.

10. The underwater vehicle of claim 2, wherein the threshold force is below a damage threshold of a component included in the underwater vehicle.

11. The underwater vehicle of claim 10, wherein the component is the actuation system.

12. An underwater vehicle, comprising:
a first hull section including a first axial strength member;
a first pressure-bearing face connected to the first hull section aligned adjacent to the first axial strength member;
a second hull section including a second axial strength member;
a second pressure-bearing face connected to the first hull section aligned adjacent to the second axial strength member;
a threaded turnbuckle, wherein the threaded turnbuckle is configured to mate with the first and the second axial strength member.

13. The underwater vehicle of claim 12, wherein the axial strength members are composed of at least one material from the group of: carbon fiber, fiberglass, quartz, Kevlar, graphene.

14. The underwater vehicle of claim 12, wherein the threaded turnbuckle may be configured to pull the first and the second hull section together to a specified preload tension.

15. An underwater vehicle, comprising:
a carbon fiber bow, wherein the carbon fiber bow includes a plurality of slits; and
a blazed sonar array comprising a plurality of transducers, wherein the blazed sonar array is aligned to transmit through the at least one of the plurality of slits.

16. The underwater vehicle of claim 15, wherein the plurality of transducers are oriented to be substantially parallel to the curvature of the carbon fiber bow.

17. The underwater vehicle of claim 16, wherein the plurality of transducers are oriented to transmit a sonar signal in a two-dimensional plane.

18. The underwater vehicle of claim 15, wherein at least two of the plurality of transducers are oriented into a substantially parabolic shape.

19. The underwater vehicle of claim 10, wherein at least a first of the plurality of transducers is oriented orthogonally to at least a second of the plurality of transducers.

* * * * *